US005595590A

United States Patent [19]

Belding et al.

[11] Patent Number: 5,595,590

[45] Date of Patent: Jan. 21, 1997

[54] METHOD AND COMPOSITIONS FOR AUTHENTICATING A PRODUCT OR DOCUMENT

[75] Inventors: Blake Q. Belding, West Chester; JoAnn Silknitter, Pottstown; Kevin B. Stevenson, Downingtown; Terry W. Stovold, Honey Brook, all of Pa.

[73] Assignee: Nocopi Technologies, Inc., Wayne, Pa.

[21] Appl. No.: 455,949

[22] Filed: May 31, 1995

[51] Int. Cl.$^6$ .................................................... C09D 11/02

[52] U.S. Cl. .......................... 106/21 A; 106/21 R; 427/7; 428/29

[58] Field of Search ............................... 106/21 R, 21 A; 427/7; 428/29

[56] References Cited

U.S. PATENT DOCUMENTS

| | | | |
|---|---|---|---|
| 4,180,405 | 12/1979 | Lawton | 106/21 R |
| 5,057,154 | 10/1991 | Kusakata et al. | 106/21 A |
| 5,178,669 | 1/1993 | Watanabe et al. | 106/21 R |
| 5,250,108 | 10/1993 | Tanaka et al. | 106/21 A |
| 5,350,634 | 9/1994 | Sumii et al. | 106/21 A |
| 5,485,792 | 1/1996 | Keyser et al. | 106/21 A |

*Primary Examiner*—Helene Klemanski
*Attorney, Agent, or Firm*—Sprung Horn Kramer & Woods

[57] ABSTRACT

A method and compositions for authenticating a document or article comprises applying a mixture of a carrier, a leuco dye and an activator to a surface of a document or article, wherein the leuco dye and activator react in response to a rubbing force applied to the surface to change color and wherein the activator is at least one selected from the group consisting of amidophenol, anilides with hydroxyl groups and benzoamides with hydroxyl groups and authenticating the document or article by applying a rubbing force to the surface to effect a color change.

57 Claims, No Drawings

METHOD AND COMPOSITIONS FOR AUTHENTICATING A PRODUCT OR DOCUMENT

BACKGROUND OF THE INVENTION

The present invention is directed to a method, printing medium, coating, composition and activator for authenticating a product or a document to detect fraudulent duplication and counterfeiting.

In today's business environment, most documents, such as coupons, tickets, labels, checks, etc., and product packaging demand a simple verification process with a tamper evident security feature to prevent the fraudulent duplication and counterfeiting thereof.

The check market alone has encountered an estimated eleven billion dollar loss per year as a result of fraud.

The advent of color copiers and the improvements achieved in the visual quality of copies produced by such photocopiers has contributed to the fraudulent duplication and counterfeiting of valuable documents.

In U.S. No. Pat. 5,354,723, a method for protecting against duplication with a color copier is disclosed wherein a contrast color is printed on a background color. The contrast color is printed with a printing medium which also allows activation by a rubbing action.

The printing medium in U.S. Pat. No. 5,354,723 includes a color former leuco dye and activating phenolic resin which are printed and when mechanical pressure or rubbing is applied, the frictional heat causes a color change. This permits the verification that the document is an original. Applicant hereby incorporates by reference the disclosure of U.S. Pat. No. 5,354,723.

One disadvantage of the use of the leuco dye and activating phenolic resin is that temperatures above 45° C. can cause a premature color development. Temperatures above 45° C. are typical when a sheet of paper, having the leuco dye and activating phenolic resin applied with a printing medium, is passed through a photocopier, indirect or direct thermal printers, or a laser printer which is used to print the label, ticket, check or other information for which the document is to be used.

SUMMARY OF THE INVENTION

The object of the present invention is to eliminate the disadvantages of the prior art and to provide a method, composition, printing medium, coating and activator for authenticating a product or a document which is compatible with printers, photocopiers and the like where high temperatures, such as those created by a fuser.

The present invention addresses the temperature sensitivity issue by using a uniquely different activator. An amidophenol, or anilide or benzoamide with a hydroxyl group based chemical is combined with a leuco dye mixture in an ink and/or coating with a binder such as polyvinyl alcohol and is applied to a document. A printed message can then be applied to the document with a laser printer and the security printing can withstand high temperatures, without developing a color change. The later application of mechanical rubbing to the document combines both chemicals to result in a color change.

According to the present invention, a substrate can be printed or coated with an ink comprised of an amidophenol, or anilides and benzoamides with a hydroxyl group as an activating compound and a leuco dye. When the substrate is processed through high temperature equipment, there is no color change in the printed or coated area. Verification of originality occurs via moderate pressure, for instance, by burnishing the printed surface of a document with a thumbnail.

Prior to the present invention, some typical activating chemicals included: D-8, Zinc Chloride, Aklylated Zinc Salicylate, Benzyl Paraben, Phenolic resins, Bisphenols and acidic clays.

Typical leuco dyes used with those activators are, for example, supplied by Hilton Davis and include: Copikem 1, Copikem 4, Copikem 14, Copikem 3, Copikem 20, Copikem 34, Copikem 37 or by Ciba-Geigy and include Pergascript Blue I-2G, Pergascript Yellow I-3R, Pergascript Orange I-5R, Pergascript Blue I-2R, Pergascript Green I-2GN, Pergascript Olive I-G, Pergascript Black I-R.

The prior art activators when mixed with the leuco dyes, where printed or coated onto a substrate and produced a color change upon passing through high temperature equipment.

The activator chemicals according to the present invention comprise amidophenol, anilides and benzoamides with a hydroxyl group including N-(4-Hydroxyphenyl) acetamide, 2-Acetamidophenol, 3-Acetamidophenol, Salicylanilide, p-Hydroxybenzamide, p-Hydroxyphenyl acetamide, 3-Hydroxy-2-Napthanilide, o-Hydroxybenzanilide.

One or more of the activators of the present invention can be mixed with one or more leuco dyes to tailor the reaction temperature and increase or decrease the ease of physically producing color development.

Prior to the invention, it was believed that amine-containing activators could be used in solution where the activator was soluble in a selected solvent. However, amine based activators were generally not believed useful for color generation on a paper substrate since the presence of amines or amides was believed to erase the color or otherwise prevent color generation.

For these reasons, the use of phenolic resins as activators in U.S. Pat. No. 5,354,723 would not be expected to include the amide-derivatives disclosed herein. These amidophenols, hydroxyanilide and benzoamide derivatives are neither disclosed nor suggested n that patent.

It was totally unexpected that the use of either amidophenols, hydroxyanilides or benzoamides could be used as activators for color generation on a paper substrate.

Another feature of the present invention is that the color developed by the mechanical combination of the leuco dye and the activator can be made to disappear again at various temperature ranges.

In accordance with the invention a method for authenticating a document or article comprises the steps of applying a mixture of a carrier, a leuco dye and an activator to a surface of a document or article, wherein the leuco dye and activator react in response to a rubbing force applied to the surface to change color and wherein the activator is at least one selected from the group consisting of amidophenol, anilides with hydroxyl groups and benzoamides with hydroxyl groups and authenticating the document or article by applying a rubbing force to the surface to effect a color change.

In accordance with another embodiment of the invention, a composition for authenticating a document or article comprises a mixture of a carrier, a leuco dye and an activator to a surface of a document or article, wherein the leuco dye and activator react in response to a rubbing force applied to the surface-to change color and wherein the activator is at least one selected from the group consisting of amidophenol, anilides with hydroxyl groups and benzoamides with hydroxyl groups.

In accordance with a further embodiment of the present invention, a printing medium for authenticating a document or article comprises a mixture of an ink, a leuco dye and an activator to a surface of a document or article, wherein the leuco dye and activator react in response to a rubbing force applied to the surface to change color and wherein the activator is at least one selected from the group consisting of amidophenol, anilides with hydroxyl groups and benzoamides with hydroxyl groups.

In accordance with a still further embodiment of the present invention, a composition for use as an activator for a leucodye, comprises at least one selected from the group consisting of amidophenol, anilides with hydroxyl groups and benzoamides with hydroxyl groups.

In accordance with another embodiment of the invention, a compound for use as an activator for a leucodye, consists essentially of at least one selected from the group consisting of amidophenol, anilides with hydroxyl groups and benzoamides with hydroxyl groups.

These and other features of the present invention will be evident from the detailed description of the invention and examples set forth hereinafter.

DETAILED DESCRIPTION OF THE INVENTION

The activator in accordance with the present invention preferably has to have the characteristics of either low or no solubility in water and typical flexosolvents, a melting point preferably above 115° C. and activatable by physically combining both the activator and leuco dye ingredients. The activator also has to be stable in a flexographic ink environment.

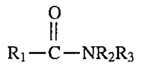

wherein $R_1$ is a phenolic derivative or—$C_6H_4OH$;

$R_2$ is H, a branched or unbranched alkyl group or an aryl group; and $R_3$ is H, a branched or unbranched alkyl group or an aryl group;

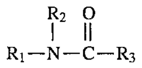

wherein $R_1$ is a o-, m-, or p-phenolic group;

$R_2$ is H, a branched or unbranched alkyl group or an aryl group; and $R_3$ is H, a branched or unbranched alkyl group or an aryl group; or

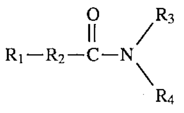

wherein $R_1$ is a o-, m-, or p-phenolic group;

$R_2$ is a branched or unbranched alkyl group or an aryl group;

$R_3$ is H, a branched or unbranched alkyl group or an aryl group; and $R_4$ is H, a branched or unbranched alkyl group or an aryl group;

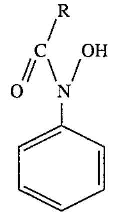

where R=H, alkyl or aryl derivatives; or

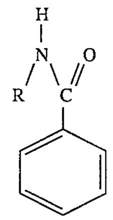

where R=hydroxyalkyl or hydroxyaryl derivatives.

In accordance with the invention, the activator is preferably one selected from the group consisting of:

$CH_3CONHC_6H_4OH$

2-Acetamidophenol

3-Acetamidophenol

4-Acetamidophenol having the generic formula $CH_3CONHCH_6H_4OH$

Salicylanilide $HOC_6H_4CONHC_6H_5$ p-Hydroxybenzamide $HOC_6H_4CH_2CONH_2$ p-Hydroxyphenylacetamide $HOC_6H_4CH_2CONH_2$ 3-Hydroxy-2-Napthanilide $HOC_{10}H_6CONHC_6H_5$ o-Hydroxybenzanilide $HOC_6H_4NHCOC_6H_5$ The above chemicals are combined in formulations of various ratios in order to provide tailoring of the process in accordance with the needs of the user.

The amidophenol N - 4-Hydroxyphenyl acetamide has the characteristics of lower poor solubility in water and most common flexographic solvents, a melting point of 169°–170° C., reacts well with a leuco dye for good color development and it has good stability in flexographic ink environments.

A printing medium in accordance with the present invention has the characteristics of laser compatibility, that is, a melting point of higher than 115° C. and toner compatible qualities. In accordance with the present invention, a printing medium which meets these qualifications is a flexographic based ink and in particular, AWX5-92074 flexographic base because it is laser compatible with a melting point above 200° C., has excellent toner adhesion qualities and has a pH of 8.5. It was also found that the dye and the activator in accordance with the present invention produced no noticeable premature color development.

The leuco dye can be any of the previously mentioned conventional leuco dyes, preferably one with a high melting point, i.e., above 115° C. and which is stable in a flexographic base ink. In accordance with the present invention, the leuco dye CIBA GEIGY I2G Blue was found to have all of these qualities.

In a preferred embodiment of the present invention, the leuco dye and activator are wet micronized into the flexographic base with a ratio by weight of the activator to leuco dye being from about 1:1 to 8:1, preferably 4:1.

EXAMPLE I

On a sheet of check paper having a white background color, the word "ORIGINAL" was printed as a watermark with a printing medium.

Prior to printing, the printing medium was prepared by mixing AWX5-92074 flexographic base with a wet micronized leuco dye CIBA GEIGY 12G Blue and a wet micronized activator of N - (4-Hydroxyphenyl) acetamide. The activator to leuco dye ratio was 4:1 by weight.

The paper with the printed watermark and background color was passed through an Okidata 400 laser printer to print text information thereon. No color development occurred as a result of the printing by the laser printer.

A mechanical rubbing action was thereafter applied to the area wherein the word "ORIGINAL" was printed as a watermark and color development occurred to verify that the document was an original.

The developed paper was then subjected to temperatures of from 80° C. to 140° C. and the color change disappeared.

EXAMPLE II

N-(4-Hydroxyphenyl) acetamide was placed into a mixture of a binder, water and a surfactant. This was then wet micronized to the appropriate particle size for compatibility with a variety of coating and printing processes, i.e., Flexographic, gravure printing.

Copikem 1, a leuco dye from Hilton Davis, was placed into a mixture of binder, water and surfactant. This was then wet micronized to the appropriate particle size for coating and printing processes.

The mixture of N-(4-Hydroxphenyl) acetamide was mixed with the wet micronized Copikem 1 leuco dye at various solids ratios from 1:1 to 8:1 to alter the physical characteristics of the mechanical verification and temperature sensitivity, i.e., the amount of rubbing or degree of temperature required to obtain the intensity or appearance of color. The preferred ratio was 6:1.

Similar properties can be obtained by using one or more of the amidophenol, or hydroxyl group containing anilides or benzoamides. Similarly, various leuco dyes may be employed to generate or enhance color development.

In terms of offset printing, the activator and leuco dye must be dry micronized to the appropriate particle size then placed into an offset ink base, i.e., soya oil base, standard oil bases.

The invention also incorporates a sensitivity to common solvents used to alter documents. These solvents result in a visible color bloom on the printed or coated area of the substrate indicating alteration.

The present invention also has a unique feature whereby the color developed by rubbing the printed area on a substrate or various degrees of temperature causes a color to appear or dissipate.

Heating of Hilton Davis CK 1 and N-(4-hydroxyphenyl) acetamide on a paper substrate developed a slight color reaction (approximately 136° C. to 149° C.) as the surface temperature of the paper increased until a reaction temperature (approximately 151° C.) was reached where a color change occurs, giving a fully developed color. Increasing the temperature further (approximately 155° C. to 174° C.) causes the color to fade, however, in this temperature range when removed from the heat source color is instantly restored to its fully developed form. Increasing temperatures even further cause the color to change, i.e., from blue to green. Once this final color change occurs (approximately 176° C.), the color development reversal property is no longer effective.

As a result of this characteristic, the composition can be used in combination with a photoelectric switch to actuate in response to color changes effected by rubbing and application of heat. The composition can also be used in games where information must be concealed and then revealed.

Color dissipation can occur over time at normal room temperature. The simple act of a forced exhalation at close proximity to the printed or coated area on the substrate can cause developed color to dissipate.

The present invention deters fraudulent color copying and fraudulent desktop publishing with the ability to identify the originality of the document. By color copying or desktop publishing, there exists no ability to duplicate the invention.

It is understood that the embodiments described hereinabove are merely illustrative and are not intended to limit the scope of the invention. It is realized that various changes, alterations, rearrangements and modifications can be made by those skilled in the art without substantially departing from the spirit and scope of the present invention.

What is claimed is:

1. A composition for authenticating a document or article comprising a mixture of a carrier, a leuco dye and an activator and wherein the activator is at least one selected from the group consisting of amidophenol, anilides with hydroxyl groups and benzoamides with hydroxyl groups.

2. The composition according to claim 1, wherein the mixture is non-pressure sensitive and reacts in response to friction heat.

3. The composition according to claim 1, wherein the ratio of activator to leuco dye is from about 1:1 to 8:1.

4. The composition according to claim 1, wherein the ratio of activator to leuco dye is 4:1.

5. The composition according to claim 1, wherein the carrier comprises a binder, water and a surfactant.

6. The composition according to claim 1, wherein the activator comprises

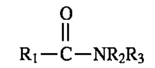

wherein $R_1$ is a phenolic derivative or—$C_6H_4OH$;

$R_2$ is H, a branched or unbranched alkyl group or an aryl group; and $R_3$ is H, a branched or unbranched alkyl group or an aryl group.

7. The composition according to claim 1, wherein the activator comprises

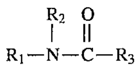

wherein $R_1$ is a o-, m-, or p-phenolic group;

$R_2$ is H, a branched or unbranched alkyl group or an aryl group; and $R_3$ is H, a branched or unbranched alkyl group or an aryl group.

8. The composition according to claim 1, wherein the activator comprises

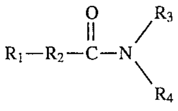

wherein $R_1$ is a o-, m-, or p-phenolic group;

$R_2$ is a branched or unbranched alkyl group or an aryl group;

$R_3$ is H, a branched or unbranched alkyl group or an aryl group; and $R_4$ is H, a branched or unbranched alkyl group or an aryl group.

9. The composition according to claim 1, wherein the activator comprises

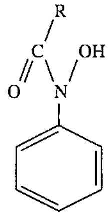

where R=H, alkyl or aryl derivatives.

10. The composition according to claim 1, wherein the activator comprises

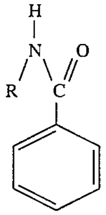

where R=hydroxyalkyl or hydroxyaryl derivatives.

11. A printing medium for authenticating a document or article comprising a mixture of an ink, a leuco dye and an activator and wherein the activator is at least one selected from the group consisting of amidophenol, anilides with hydroxyl groups and benzoamides with hydroxyl groups.

12. The printing medium according to claim 11, wherein the mixture is non-pressure sensitive and reacts in response to friction heat.

13. The printing medium according to claim 11, wherein the ratio of activator to leuco dye is from about 1:1 to 8:1.

14. The printing medium according to claim 11, wherein the ratio of activator to leuco dye is 4:1.

15. The printing medium according to claim 11, wherein the activator comprises

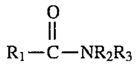

wherein $R_1$ is a phenolic derivative or—$C_6H_4OH$;

$R_2$ is H, a branched or unbranched alkyl group or an aryl group; and $R_3$ is H, a branched or unbranched alkyl group or an aryl group.

16. The printing medium according to claim 11, wherein the activator comprises

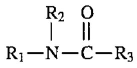

wherein $R_1$ is a o-, m-, or p-phenolic group;

$R_2$ is H, a branched or unbranched alkyl group or an aryl group; and $R_3$ is H, a branched or unbranched alkyl group or an aryl group.

17. The printing medium according to claim 11, wherein the activator comprises

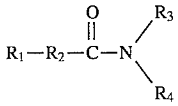

wherein $R_1$ is a o-, m-, or p-phenolic group;

$R_2$ is a branched or unbranched alkyl group or an aryl group;

$R_3$ is H, a branched or unbranched alkyl group or an aryl group; and $R_4$ is H, a branched or unbranched alkyl group or an aryl group.

18. The printing medium according to claim 11, wherein the activator comprises

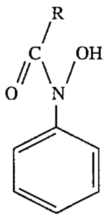

where R=H, alkyl or aryl derivatives.

19. The printing medium according to claim 11, wherein the activator comprises

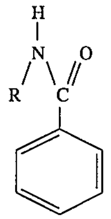

where R=hydroxyalkyl or hydroxyaryl derivatives.

20. A composition for authenticating a document or article comprising a mixture of a carrier, a leuco dye having a melting point of greater than 115° C. and an activator having a melting point of greater than 115° C. and wherein the activator is at least one selected from the group consisting of amidophenol, anilides with hydroxyl groups and benzoamides with hydroxyl groups.

21. The composition according to claim 20, wherein the carrier has a melting point above 115° C.

22. The composition according to claim 20, wherein the ratio of activator to leuco dye is from 1:1 to 8:1.

23. The composition according to claim 20, wherein the ratio of activator to leuco dye is 4:1.

24. The composition according to claim 20, wherein the carrier comprises a binder, water and a surfactant.

25. The composition according to claim 20, wherein the activator comprises

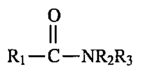

wherein $R_1$ is a phenolic derivative or—$C_6H_4OH$;

$R_2$ is H, a branched or unbranched alkyl group or an aryl group; and $R_3$ is H, a branched or unbranched alkyl group or an aryl group.

26. The composition according to claim 20, wherein the activator comprises

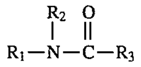

wherein $R_1$ is a o-, m-, or p-phenolic group;

$R_2$ is H, a branched or unbranched alkyl group or an aryl group; and $R_3$ is H, a branched or unbranched alkyl group or an aryl group.

27. The composition according to claim 20, wherein the activator comprises

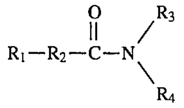

wherein $R_1$ is a o-, m-, or p-phenolic group;

$R_2$ is a branched or unbranched alkyl group or an aryl group;

$R_3$ is H, a branched or unbranched alkyl group or an aryl group; and $R_4$ is H, a branched or unbranched alkyl group or an aryl group.

28. The composition according to claim 20, wherein the activator comprises

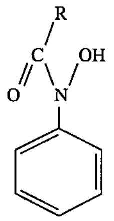

where R=H, alkyl or aryl derivatives.

29. The composition according to claim 20, wherein the activator comprises

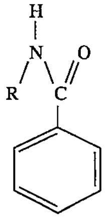

where R=hydroxyalkyl or hydroxyaryl derivatives.

30. A printing medium for authenticating a document or article comprising a mixture of an ink, a leuco dye having a melting point of greater than 115° C. and an activator having a melting point of greater than 115° C. and wherein the activator is at least one selected from the group consisting of amidophenol, anilides with hydroxyl groups and benzoamides with hydroxyl groups.

31. The printing medium according to claim 30, wherein the ink has a melting point above 115° C.

32. The printing medium according to claim 30, wherein the ratio of activator to leuco dye is from 1:1 to 8:1.

33. The printing medium according to claim 30, wherein the ratio of activator to leuco dye is 4:1.

34. The printing medium according to claim 30, wherein the activator comprises

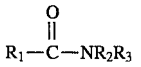

wherein $R_1$ is a phenolic derivative or—$C_6H_4OH$;

$R_2$ is H, a branched or unbranched alkyl group or an aryl group; and $R_3$ is H, a branched or unbranched alkyl group or an aryl group.

35. The printing medium according to claim 30, wherein the activator comprises

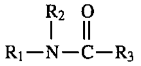

wherein $R_1$ is a o-, m-, or p-phenolic group;

$R_2$ is H, a branched or unbranched alkyl group or an aryl group; and $R_3$ is H, a branched or unbranched alkyl group or an aryl group.

36. The printing medium according to claim 30, wherein the activator comprises

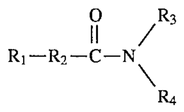

wherein $R_1$ is a o-, m-, or p-phenolic group;

$R_2$ is a branched or unbranched alkyl group or an aryl group;

$R_3$ is H, a branched or unbranched alkyl group or an aryl group; and $R_4$ is H, a branched or unbranched alkyl group or an aryl group.

37. The printing medium according to claim 30, wherein the activator comprises

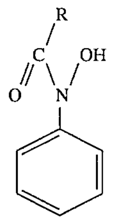

where R=H, alkyl or aryl derivatives.

38. The printing medium according to claim 30, wherein the activator comprises

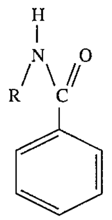

where R=hydroxyalkyl or hydroxyaryl derivatives.

39. A composition for authenticating a document or article comprising a mixture of a carrier, a wet micronized leuco dye and a wet micronized activator and wherein the activator is at least one selected from the group consisting of amidophenol, anilides with hydroxyl groups and benzoamides with hydroxyl groups.

40. The composition according to claim 39, wherein the activator has a melting point above 115° C.

41. The composition according to claim 39, wherein the ratio of activator to leuco dye is from 1:1 to 8:1.

42. The composition according to claim 39, wherein the ratio of activator to leuco dye is 4:1.

43. The composition according to claim 39, wherein the carrier comprises a binder, water and a surfactant.

44. The composition according to claim 39, wherein the activator comprises

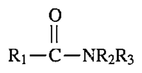

wherein $R_1$ is a phenolic derivative or—$C_6H_4OH$;

$R_2$ is H, a branched or unbranched alkyl group or an aryl group; and $R_3$ is H, a branched or unbranched alkyl group or an aryl group.

45. The composition according to claim 39, wherein the activator comprises

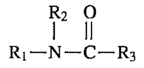

wherein $R_1$ is a o-, m-, or p-phenolic group;

$R_2$ is H, a branched or unbranched alkyl group or an aryl group; and $R_3$ is H, a branched or unbranched alkyl group or an aryl group.

46. The composition according to claim 39, wherein the activator comprises

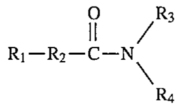

wherein $R_1$ is a o-, m-, or p-phenolic group;

$R_2$ is a branched or unbranched alkyl group or an aryl group;

$R_3$ is H, a branched or unbranched alkyl group or an aryl group; and $R_4$ is H, a branched or unbranched alkyl group or an aryl group.

47. The composition according to claim 39, wherein the activator comprises

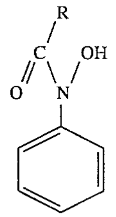

where R=H, alkyl or aryl derivatives.

48. The composition according to claim 39, wherein the activator comprises

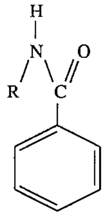

where R=hydroxyalkyl or hydroxyaryl derivatives.

49. A printing medium for authenticating a document or article comprising a mixture of an ink, a wet micronized leuco dye and a wet micronized activator and wherein the activator is at least one selected from the group consisting of amidophenol, anilides with hydroxyl groups and benzoamides with hydroxyl groups.

50. The printing medium according to claim 49, wherein the activator has a melting point above 115° C.

51. The printing medium according to claim 49, wherein the ratio of activator to leuco dye is from 1:1 to 8:1.

52. The printing medium according to claim 49, wherein the ratio of activator to leuco dye is 4:1.

53. The printing medium according to claim 49, wherein the activator comprises

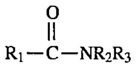

wherein $R_1$ is a phenolic derivative or—$C_6H_4OH$;

$R_2$ is H, a branched or unbranched alkyl group or an aryl group; and $R_3$ is H, a branched or unbranched alkyl group or an aryl group.

54. The printing medium according to claim 49, wherein the activator comprises

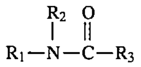

wherein $R_1$ is a o-, m-, or p-phenolic group;

$R_2$ is H, a branched or unbranched alkyl group or an aryl group; and $R_3$ is H, a branched or unbranched alkyl group or an aryl group.

55. The printing medium according to claim 49, wherein the activator comprises

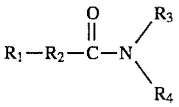

wherein $R_1$ is a o-, m-, or p-phenolic group;

$R_2$ is a branched or unbranched alkyl group or an aryl group;

$R_3$ is H, a branched or unbranched alkyl group or an aryl group; and $R_4$ is H, a branched or unbranched alkyl group or an aryl group.

56. The printing medium according to claim 49, wherein the activator comprises

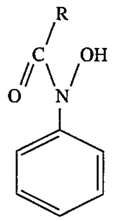

where R=H, alkyl or aryl derivatives.

57. The printing medium according to claim 49, wherein the activator comprises

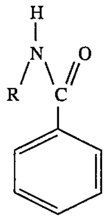

where R=hydroxyalkyl or hydroxyaryl derivatives.

* * * * *